(12) United States Patent
Heinzen et al.

(10) Patent No.: US 8,297,889 B2
(45) Date of Patent: Oct. 30, 2012

(54) LOADING AND UNLOADING DEVICE FOR CARGO CONTAINERS, SILOS AND OTHER VESSELS

(76) Inventors: Thomas Heinzen, Koblenz (DE); Christian Hanses, Sessenhausen (DE)

( * ) Notice: Subject to any disclaimer, the term of this patent is extended or adjusted under 35 U.S.C. 154(b) by 529 days.

(21) Appl. No.: 12/519,980

(22) PCT Filed: Jan. 8, 2007

(86) PCT No.: PCT/EP2007/000083
§ 371 (c)(1),
(2), (4) Date: Jun. 18, 2009

(87) PCT Pub. No.: WO2008/083705
PCT Pub. Date: Jul. 17, 2008

(65) Prior Publication Data
US 2010/0080677 A1 Apr. 1, 2010

(30) Foreign Application Priority Data
Dec. 20, 2006 (DE) .................. 20 2006 019 188 U

(51) Int. Cl.
*B60P 1/60* (2006.01)
(52) U.S. Cl. .......... 406/41; 406/116; 406/167; 198/950; 296/24.4; 414/395
(58) Field of Classification Search .................. 414/291, 414/298, 395; 198/950; 406/41, 116, 167; 296/24.4, 24.37
See application file for complete search history.

(56) References Cited

U.S. PATENT DOCUMENTS

| 4,659,262 | A | | 4/1987 | Van Aalst |
| 4,988,240 | A | * | 1/1991 | Thompson ............... 406/166 |
| 5,718,017 | A | * | 2/1998 | Pavlick ................ 15/340.1 |
| 6,317,919 | B1 | * | 11/2001 | Dahlin et al. ............ 15/314 |
| 6,415,909 | B1 | | 7/2002 | Mitchell et al. |
| 2003/0141054 | A1 | * | 7/2003 | Wade et al. .......... 166/250.01 |

FOREIGN PATENT DOCUMENTS

| DE | 4431063 | 3/1996 |
| WO | 0125124 | 4/2001 |

* cited by examiner

*Primary Examiner* — Scott Lowe
(74) *Attorney, Agent, or Firm* — The Webb Law Firm

(57) ABSTRACT

A loading and unloading device for cargo containers, such as sea containers, silos and other vessels, of mobile design, whereby a container, one end face of which can be opened or closed and can and can be connected flush to a cargo container for bulk goods to be loaded or unloaded, whereby the device container is equipped with least one telescoping tube that can be inserted or withdrawn from the cargo container to be loaded or unloaded, an associated motive power aggregate and a connector for the conveyance of bulk goods into or out of the cargo container to be loaded or unloaded, a suction unit with propelling air outlet, a motor-compressor unit with propelling air inlet for propelling air supply into the cargo container to be loaded or unloaded, a vacuum and filter system and an operating and control unit.

9 Claims, 4 Drawing Sheets

LOADING AND UNLOADING DEVICE FOR CARGO CONTAINERS, SILOS AND OTHER VESSELS

BACKGROUND OF THE INVENTION

1. Field of the Invention

The invention concerns a loading and unloading device for cargo containers, silos and other vessels.

2. Description of Related Art

For a long time, bulk goods haven been transported in standardized containers. The aim is to fill bulk goods into standardized loading aids for the purpose of transport with trucks, by railway or on board of ships. Containers are particularly well suited as loading aids. These containers consist of large volume vessels for the storage and transport of goods, with robust construction and sufficiently resistant to allow repeated use by several modes of transport without the necessity of transferring the contents. They exist in many different sizes and, as a rule, are standardized.

In addition, they are equipped with facilities to allow easy transfer from one mode of transport to another. The so-called ISO containers represent the most well-known and important type of container. These are in most cases 20 or 40 foot sea containers. These containers are used to process a large part of trading goods. They have the advantage that, due to their standardized shape and dimensions, they can be transported and quickly transferred by a wide variety of transport modes, such as ocean going ships, inland navigation vessels, railways and trucks.

Frequently, bulk goods are also stored in silos and bunkers, from which they must be removed and filled into such containers. Typical bulk goods are building materials such as top soil, sand, gravel, cement, other mineral goods such as ore, road salt and foodstuffs such as grain, sugar, salt, coffee, flour as well as powdery goods such as pigments, fillers, granulates, pellets, etc.

Bulk goods are often stored in silos or bunkers. There are transported either by continual, uninterrupted flowing modes, for example, belt conveyors and bucket conveyors, or by pneumatic-fluid conveyance by means of air flow, for example in bulk good holds or bunkers of ships, in skips and high-board vehicles, silo trucks, trucks, railway cars etc. in sacks or bags used as transport packaging for lightweight piece goods or bulk goods.

The loading and transport process of bulk goods is always subject to an elaborate and varied procedure. The following loading and transport procedure is described by way of example.

To begin with, for example, a tipping silo trailer, attached to a tractor-trailer with built-in air compressor, is loaded by means of compressed air with bulk goods from a high-rise silo. Subsequently, the goods are transported by road to the packaging industry. Here, the tipping silo trailer is unloaded into the stationary storage silo of the packaging company. After that, the bulk goods are packaged in Big Bags or sacks. The gods packaged in sacks or Big Bags are then transported by road to the sea port, where they are manually loaded into a sea container. In this procedure, for example, Big Bags are loaded into containers by fork lift trucks. Subsequently, the containers are loaded onto a container ship.

Naturally, this process may take place in various ways, e.g. loading from trucks onto railway cars, from there onto ships, from ships onto trucks, etc.

It has become apparent that there are considerable deficits in current processes and procedures with regard to unnecessary transport routes, excessive packaging, a lack of information flow as well as communication from one loading and transport stage to another. Thus, loading and transport processes are too cumbersome, too elaborate and too cost intensive. Beyond that, in conventional loading of containers with Big Bags, sacks or bulk loading by conveyor belt or screw, the full volume and tonnage of the container is not fully utilized.

The current loading and transport structure, namely the production of bulk goods, loading of bulk goods in tipping trailers or silo trailers, transport to the packaging industry, transport of packaged goods to the sea port, loading of goods into containers and sea transport to their destination, carries a considerable potential to achieve a higher level of allocation efficiency while saving resources and optimizing processing times.

SUMMARY OF THE INVENTION

The objective of the invention is to create a loading and unloading device for containers of the above mentioned type, which makes loading and transport more efficient by cutting down on loading and unloading stages as well as transport routes.

According to the present invention, this objective is achieved by the fact that it is mobile, whereby a container is arranged on a swap body platform that can be transported by truck, one end of which can be opened or closed and can be connected flush to a cargo container for bulk goods to be loaded or unloaded, whereby the device container is equipped at least with a telescoping tube that can be inserted into or withdrawn from the cargo container to be loaded or unloaded, an associated motive power aggregate and a connector for the conveyance of bulk goods into or out of the cargo container to be loaded or unloaded, a suction unit with propelling air outlet, a motor-compressor unit with propelling air inlet for propelling air supply into the cargo container to be loaded or unloaded, a vacuum and filter system and an operating and control unit.

The essential advantage of the present invention consists of the mobility of the loading and unloading device, i.e. the portability from one location to another without a problem using a standard truck capable of accepting the swap body platform with the device container mounted on it. Thus, the mobile loading and unloading device for cargo containers, silos and other vessels is ideally suited for use in any desired location, even under the most difficult ambient conditions, without the necessity of installing corresponding fixed facilities at great expenditures and costs. Especially in application cases, in which bulk goods need to be loaded or unloaded or transported just once or a few times, the use of such a mobile loading and unloading device is particularly economical. For that purpose, all apparatus and equipment required for loading and unloading of bulk goods into or out of a cargo container is housed in the loading and unloading device according to the present invention in a relatively small space.

In this way, loading and unloading of cargo containers of any type with bulk goods can take place directly by means of the loading and unloading device, for example, from a silo storing bulk goods into a bulk goods container for transport by truck to a ship, and vice versa. For example, bulk goods can be transferred directly from a tipping silo trailer or from a stockpile into a 20 or 40 foot sea container, regardless of the location, e.g. at the production site of the bulk goods itself, at the storage facility, namely at the stockpile of the bulk goods, at the railway freight yard or at the sea port. In this procedure, a sea container can be loaded or unloaded directly on the railway car or truck without being set down on the ground. In this way, intermediate steps, such as packing into bags, manual loading, multiple transferring are eliminated and unnecessary interim transports by road are avoided.

The complete device according to the present invention, when installed on the swap body platform, can be deposited directly on the ground at the location of use by the truck used for its transport, which is not required for the device to be functional.

The device according to the present invention offers a number of additional advantages:

By means of blowing loose bulk goods with propelling air as a carrier medium, preferably through a high compression screw compressor, the device allows the complete utilization of the loading capacity of the cargo container to be loaded or unloaded into every last corner within the shortest possible time.

Since in this process at least one complete processing stage is omitted, namely packing in bags, the highest savings in this area can be achieved in the reduction of costs and; beyond that, the burden on the environment is reduced, as well.

The device according to the present invention provides an enormous advantage in time savings by making it possible to load or unload about 25 tons in less than one hours.

In addition, the suction function allows loading of bunker silos, inland navigation vessels, railways cars and sea containers with bulk goods and similar goods. Likewise, in reverse it is also possible to unload the above mentioned transport and storage facilities.

Beyond that, broken down transport vehicles can be unloaded effectively, quickly and without further impairment of materials. Furthermore, a large portion of transports by road can be environment-friendly omitted, so that by reducing transport routes and shifting to other transport modes such as rail and inland navigation vessels it is possible to save resources.

Calculations have shown that the use of the loading and unloading device according to the present invention will result in costs savings of approx. 40% and time savings of approx. 75% for loading and unloading as well as transport of bulk goods.

The robust and easy to operate loading and unloading device can be operated by anyone following a short instruction period. Durability and secure handling are guaranteed by the use of high-quality materials.

The device can also be used in newly industrialized countries and third world countries, because this is exactly where there is a lack of expensive, stationary facilities. Beyond that, the development of new export potentials, including for smaller business enterprises, is made possible.

Furthermore, it will be possible to open up new markets, since up to now the shipment of low cost bulk goods was not feasible due to transport and loading costs, or bulk goods could not be loaded or unloaded up to now due to technical or economic reasons.

The speed of cargo handling is increased and, aside from cost savings, an economic impulse is achieved, thus increasing the gross national product.

Further characteristics of the invention result from the sub-claims.

In order to be able to completely seal off one end of the device container mounted on the swap body platform, at least one end of the device container is equipped with a roller shutter. However, it is also possible, to equip the front face of the device container with a sealing frame instead or in addition, in order to prevent the bulk goods from escaping to the surrounding area during loading and unloading of a cargo container. The sealing frame may serve the purpose of a circumferential loading ramp contact pad, protecting the cargo container to be loaded or unloaded and the device container mounted on the swap body platform against damage during handling of the device. It also serves the purpose of forming a sealed space between the inside of the device container mounted on the swap body platform and the docked cargo container, e.g. a sea container to be loaded or unloaded. This sealed space may be made accessible from the outside by means of a fold-down stair and door, in order to gain access to install a liner bag or rear sheathing inside the sea container after docking.

In a preferable embodiment of the present invention, the telescoping tube is equipped with a header and is extendable into and retractable out of the cargo container to be loaded or unloaded. The header is designed to distribute the bulk goods emerging from the telescoping tube in optimal fashion across the entire width and height of the cargo container to be loaded in order to assure even filling right up to the ceiling of the cargo container.

The telescoping tube is extended into the cargo container just below the ceiling in the horizontal center of the cargo container to be loaded by means of, for example, a roller chain drive, and during the filling procedure is slowly withdrawn in accordance with the progress of the filling procedure. The end positions of the telescoping tube can be defined by means of proximity switches.

A preferred embodiment of the telescoping tube is vertically adjustable. The height of the tube can be adjusted on gliding tracks by means of a rack and pinion drive in order to adapt it to the different chassis heights of container vehicles, railway cars or cargo containers standing on the ground. Since an air suspension container chassis lowers itself during the loading procedure, a proximity switch may be mounted above the telescoping tube. When the cargo container being loaded moves downwards, the rack and pinion drive automatically lowers the telescoping tube by the same distance, preventing the roof of the cargo container from contacting the telescoping tube. The telescoping tube is extended into and extracted from the cargo container to be loaded or unloaded, for example, by means of push buttons and is also vertically adjustable by means of push buttons.

In order to prevent the contamination and thus jamming of the telescoping tube, controllable purging air with a pressure of up to 2 bar is introduced during the loading procedure into the telescoping tube consisting of several individual tubes. For that purpose, the telescoping tube is connected to a purging air line.

In a preferred embodiment of the present invention, the motor-compressor unit for the compressed air supply to the cargo container to be loaded or unloaded is connected to a cooling unit, preferably a heat exchanger with ventilator. The cooling unit cools the air compressed by the screw compressor. The air is then used as carrier air for the bulk goods to be loaded or unloaded.

The carrier air emerging from the liner bag of the cargo container to be loaded during the loading procedure enters an intermediate chamber in the container housing the loading and unloading device according to the present invention. From there, it is extracted by means of the vacuum and filer system, cleaned and expelled into the ambient air. For that purpose, the vacuum and filter system is equipped with a supply air connector for extraction of dust from the cargo container to be loaded or unloaded and an exhaust air connector for the expulsion of cleaned air into the ambient air, as well as a dust collection container.

According to a further embodiment of the present invention, the interior of the container housing the loading and unloading device is divided by bulkheads into at least one air lock into which the distributor head of the telescoping tube protrudes, a machinery compartment with at least one telescoping tube and associated drive aggregate, a vacuum and filter system and the operating and control unit, as well as a motor compartment housing at least the motor-compressor unit. The motor-compressor unit consists preferably of a Diesel engine with a screw compressor driven by the Diesel engine, which also drives an electrical power generator supply power to the ventilator and the vacuum and filter system. In addition, the machinery compartment may be fitted with a fuel tank for the motor-compressor unit. However, it must be pointed out that these components and aggregates may also be installed in other sections of the container housing the loading and unloading device. A suction unit for the extraction of bulk goods from, for example, a silo consists essentially of a cyclone separator and a suction fan.

To allow the placement of the loading and unloading device according to the present invention at a random site to which it has been transported by truck, the swap body platform on which it is mounted is equipped with a number of support legs. Once these support legs are extended, the truck can be uncoupled from the swap body platform and removed from under it. When the loading and unloading device is to be moved to another site, the truck is backed up with its rear cargo bed under the swap body platform and coupled to the swap body platform. The container support legs are then retracted and the loading and unloading device can be transported to a different site.

The above described loading procedures also apply in principle to unloading procedures from a container, as well.

It goes without saying that the above mentioned and in the following still to be described characteristics are applicable not only in the combination as described, but also in other combinations or as stand-alone solutions, without departing from the scope of the present invention.

BRIEF DESCRIPTION OF THE DRAWINGS

The idea on which the present invention is based is described in greater detail in the following description by way of an example, which is illustrated in the drawings. The drawings show the following.

DETAILED DESCRIPTION OF THE INVENTION

The following example of an embodiment of the present invention relates to a cargo container to be loaded with bulk goods, i.e. the loading procedure. The description applies correspondingly to the unloading procedure of the cargo container.

The loading and unloading device 1 for a vessel to be loaded with bulk goods, in this example a cargo container 2, is mounted on a, as such well-known, usually standardized swap body platform 3, on which four extendable and retractable container supports 4 are mounted, which are resting on the ground.

Figure 1:
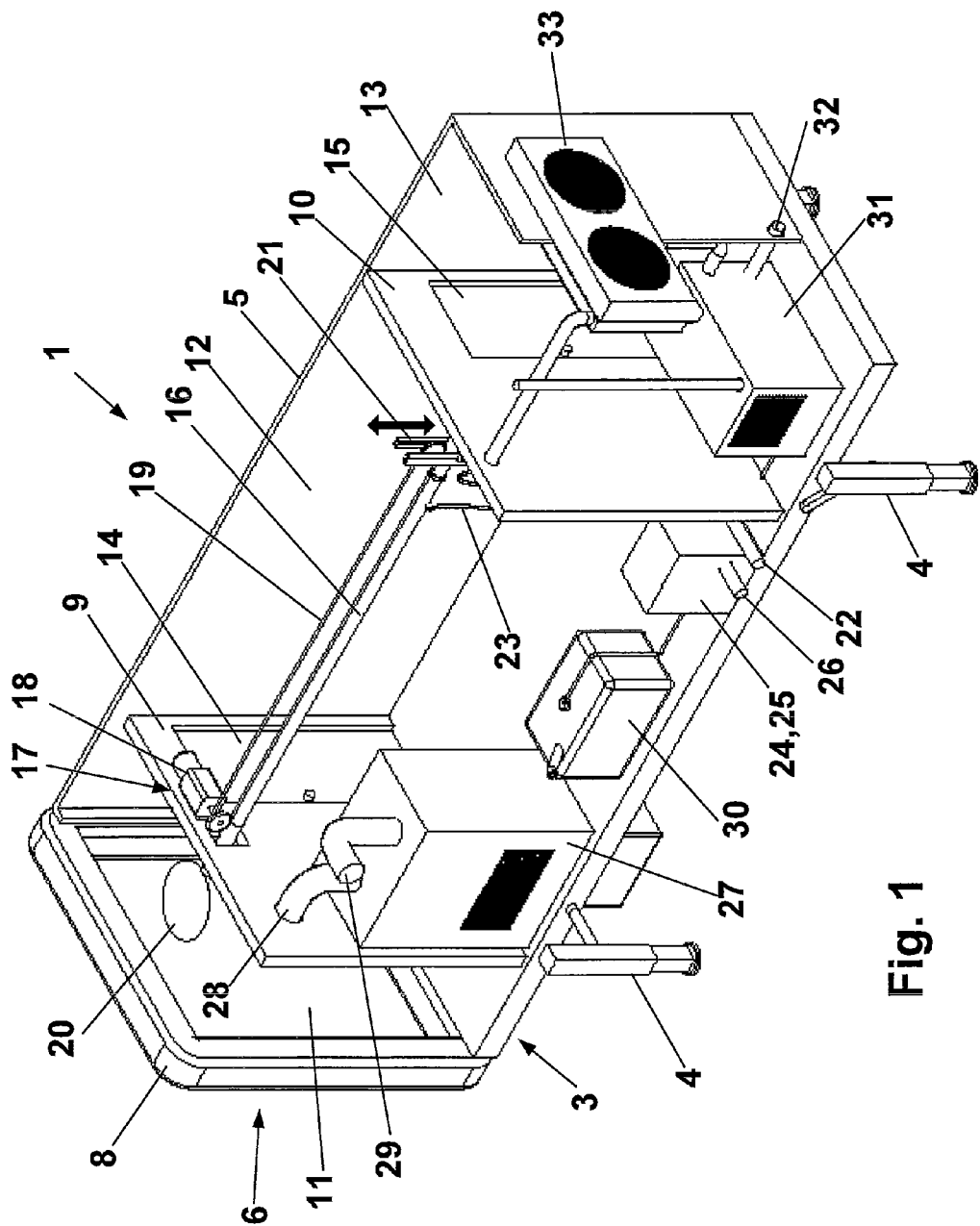
FIG. 1 a perspective view of the loading and unloading device according to the present invention for cargo containers, silos and other vessels, FIG. 2 a perspective view of the loading and unloading device according to the present invention with a cargo container to be filled with bulk goods, FIG. 3 a side elevation of the loading and unloading device according to the present invention shown in FIG. 1, and FIG. 4 a plan view of the loading and unloading device according to the present invention shown in FIG. 1.
Figure 2:
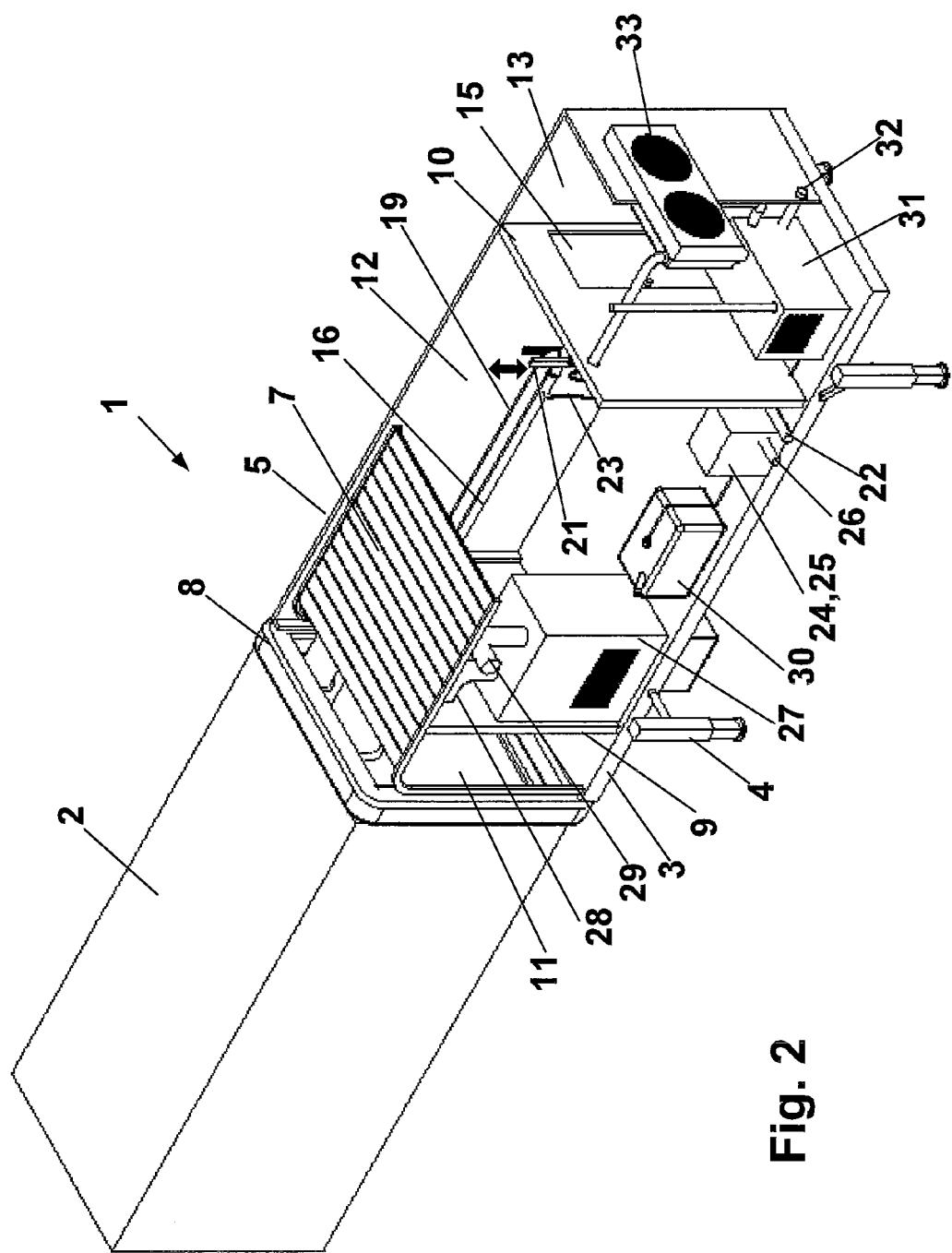
Figure 3:
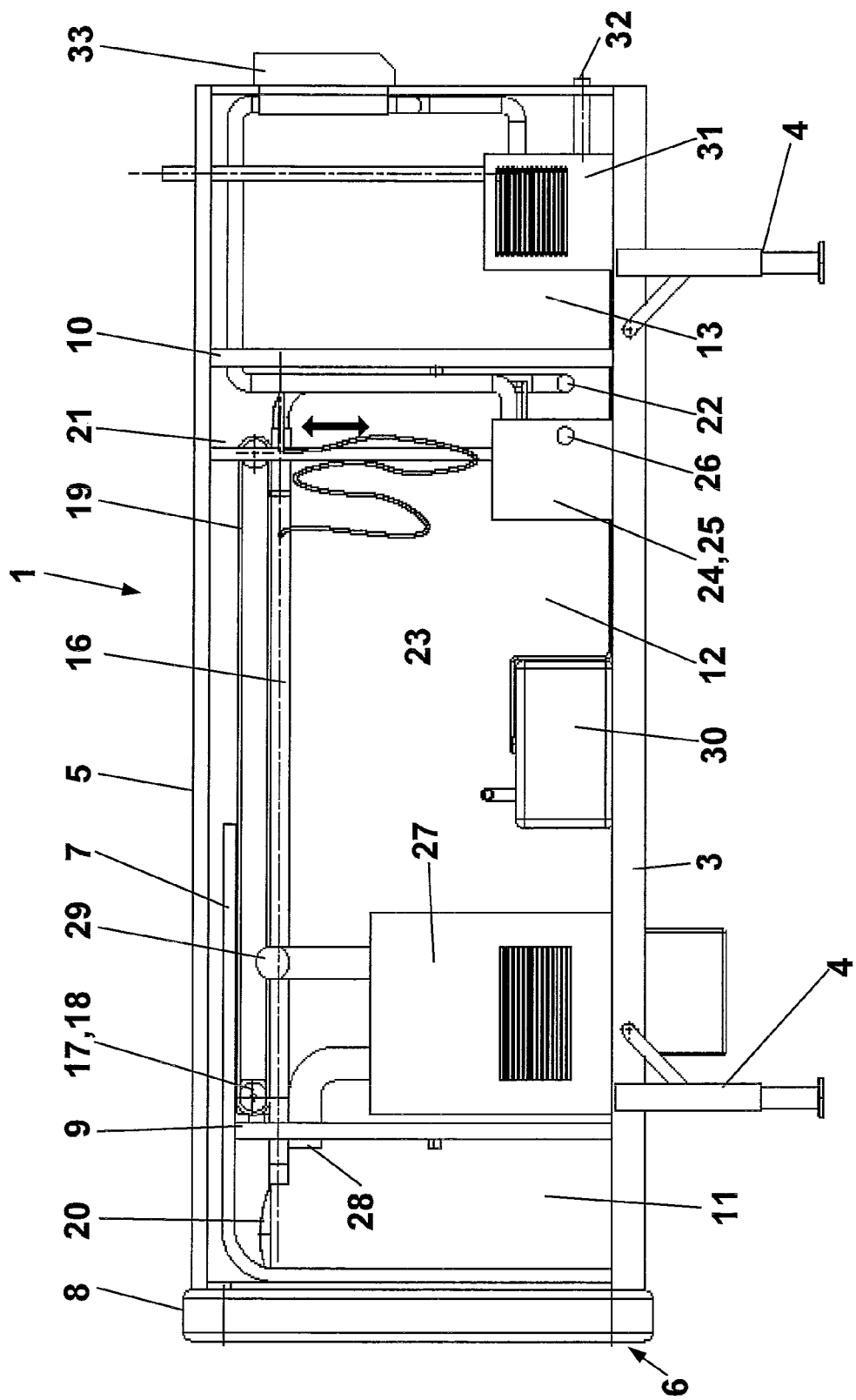
Figure 4:
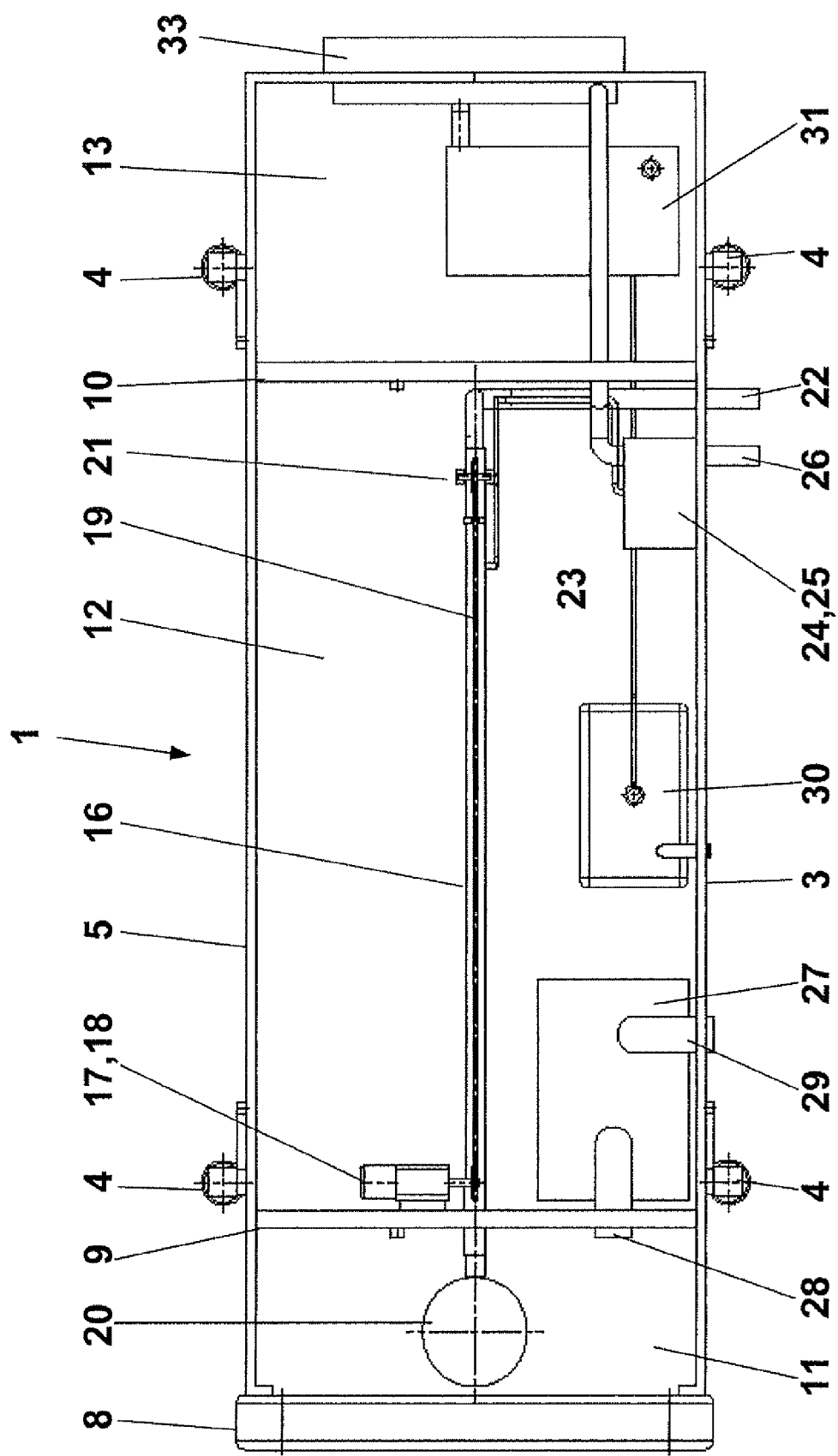

A standard container 5, one end face 6 of which is open, is mounted on the swap body platform 3. However, this end face 6 can be closed by means of a roller shutter 7, as shown in FIG. 2. Furthermore, the end face 6 of the container 5 is equipped with a circumferential sealing frame 8 made from a flexible, preferably rubber material, which is in flush contact with the corresponding end face of the cargo container 2 to be loaded during the loading procedure.

The interior space of the container 5 housing the loading and unloading device 1 is divided by two bulkheads 9 and 10 installed at a certain distance from each other, forming an air lock compartment 11, a machinery compartment 12 and a motor compartment 13. These compartments may be accessed through doors 14 or 15 installed in the bulkheads 9 and 10.

In the machinery compartment 12 of the container 5, a telescoping tube 16 is installed below the ceiling of the container, which is extendable by means of a drive aggregate 17 in the direction of the cargo container 2 to be loaded with bulk goods, which is docked onto container 5. The drive aggregate 17 consists of a geared motor 18 with chain drive 19 for the forward feed of the telescoping tube 16, which is equipped with a header 20 at the end protruding into the cargo container 2 to be loaded with bulk goods. The header 20 simultaneously serves the purpose of protecting the linerbag (not shown) installed in the cargo container 2 to be loaded.

Furthermore, the telescoping tube 16 is supported on a guide track 21 consisting of toothed racks, along which the telescoping tube 16 is vertically adjustable. The other end of the telescoping tube 16 ends in a connector 22 for the silo (not shown) in which the bulk goods are stored.

Moreover, the telescoping tube 16 is connected to a purging air line 23. The controlled purging air is introduced into the telescoping tube 16 during the loading procedure with a pressure of up to 2 bar, in order to prevent any contamination and thus jamming of the telescoping tube 16.

In the machinery compartment 12 of the container 5 housing the loading and unloading device 1, a suction unit 24 with an operating and control unit 25 is installed, whereby the latter controls all necessary equipment. The suction unit 24 essentially consists of a cyclone separator (not illustrated) and a suction fan. Moreover, the suction unit 24 is equipped with a propelling air outlet 26 for the injection of propelling air into a silo or silo vehicle, in order to convey the bulk goods stored therein through the silo connection 22 into the telescoping tube 16.

Furthermore, the machinery compartment 12 also contains a vacuum and filter system 27 with a supply air connector 28 for the extraction of dust from the air lock compartment 11 and the cargo container 2 to be loaded and the exhaust air connector 29 for the expulsion of filtered air into the ambient air.

Further to that, a fuel tank 30 is installed in the machinery compartment 12. This fuel tank supplies fuel to the motor-compressor unit 31 installed in the motor compartment 13 for the supply of compressed air into the cargo container 2 to be loaded. The motor-compressor unit 31 consists of a Diesel engine with a screw compressor driven by the Diesel engine and in addition serves the purpose of supplying power to an electrical power generator and the ventilator of the vacuum and filter system 27. Beyond that, the motor-compressor unit 31 is equipped with a propelling air inlet 32 for the injection of propelling air from the silo or silo vehicle containing the bulk goods.

Moreover, the motor compartment 13 also houses a cooling unit 33, namely a heat exchanger with fan, which is connected to the motor-compressor unit 31. The cooling unit 33 cools the air compressed by the screw compressor. The air is then used as conveying air for the bulk goods to be loaded.

The bulk goods to be loaded flow from the pressurized silo through hoses and pipes into the telescoping tube 16, which is supplied with propelling air the velocity and pressure of which can be controlled from the operating and control unit 25. The additional purging air injected into the telescoping tube 16 provides additional acceleration of the bulk goods being conveyed. The end of the telescoping tube 16 is equipped with a header 20, which, depending on the requirements of the bulk goods, can be exchanged by means of a bayonet catch. The header 20 provides even and complete filling of the cargo container 2 right up to the ceiling of the container.

The invention claimed is:

1. A loading and unloading device for cargo containers comprising:
   a mobile container, where one end face thereof is adapted to be opened or closed and is connectable in flush arrangement to a cargo container for bulk goods to be loaded or unloaded therefrom;
   at least one telescoping tube for insertion or withdrawal from the cargo container to be loaded or unloaded;
   an associated motive power aggregate and a connector for the conveyance of the bulk goods into or out of the cargo container to be loaded or unloaded;
   a suction unit having a propelling air outlet;
   a motor-compressor unit having a propelling air inlet for propelling an air supply into the cargo container to be loaded or unloaded;
   a vacuum and filter system; and
   an operating and control unit.

2. The loading and unloading device according to claim 1, wherein the one end face of the container is equipped with a roller shutter and a sealing frame.

3. The loading and unloading device according to claim 1, wherein the telescoping tube is equipped with a header and is extendable from the mobile container into the cargo container to be loaded and is retractable out of the loaded cargo container into the container.

4. The loading and unloading device according to claim 3, wherein the telescoping tube is vertically adjustable.

5. The loading and unloading device according to claim 3, wherein the interior of the mobile container is divided by bulkheads into at least:
   one air lock compartment into which the header of the telescoping tube protrudes;
   a machinery compartment containing at least the telescoping tube with associated motive power aggregate, the vacuum and filter system, and the operating and control unit; and
   a motor compartment containing at least the motor-compressor unit.

6. The loading and unloading device according to claim 1, wherein the telescoping tube is connected to a purging air line.

7. The loading and unloading device according to claim 1, wherein the motor-compressor unit is connected to a cooling unit comprising a heat exchanger with a fan.

8. The loading and unloading device according to claim 1, wherein the vacuum and filter system is equipped with a supply air connector for the extraction of dust from the cargo container to be loaded or unloaded and an exhaust air connector for the expulsion of cleaned air to ambient air external to the container, and is further equipped with a dust collection container.

9. The loading and unloading device according to claim 1, further comprising a plurality of container supports extending from the mobile container.

\* \* \* \* \*